(12) United States Patent
Ryu et al.

(10) Patent No.: US 8,512,896 B2
(45) Date of Patent: *Aug. 20, 2013

(54) ORGANIC ELECTROLYTIC SOLUTION WITH SURFACTANT AND LITHIUM BATTERY EMPLOYING THE SAME

(75) Inventors: Young-gyoon Ryu, Yongin-si (KR); Jae-young Choi, Yongin-si (KR); Eun-sung Lee, Yongin-si (KR); Seok-soo Lee, Yongin-si (KR); Do-yun Kim, Yongin-si (KR); Sang-hoon Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/941,909

(22) Filed: Nov. 8, 2010

(65) Prior Publication Data

US 2011/0081581 A1    Apr. 7, 2011

Related U.S. Application Data

(62) Division of application No. 11/357,429, filed on Feb. 17, 2006, now Pat. No. 7,875,393.

(30) Foreign Application Priority Data

| Feb. 18, 2005 | (KR) | 10-2005-0013526 |
| Aug. 3, 2005 | (KR) | 10-2005-0070970 |
| Dec. 27, 2005 | (KR) | 10-2005-0130616 |

(51) Int. Cl.
*H01M 6/16* (2006.01)

(52) U.S. Cl.
USPC .......................... 429/189; 429/326

(58) Field of Classification Search
USPC ...... 429/122–347; 523/160–161; 106/31.59, 106/31.89
See application file for complete search history.

(56) References Cited

U.S. PATENT DOCUMENTS

| 5,270,378 A | 12/1993 | Johnson et al. |
| 5,502,251 A * | 3/1996 | Pohmer et al. .................. 564/82 |
| 5,723,434 A | 3/1998 | Falk et al. |

(Continued)

FOREIGN PATENT DOCUMENTS

| CN | 1229529 A | 9/1999 |
| CN | 1501541 A | 6/2004 |

(Continued)

OTHER PUBLICATIONS

Chinese Office action dated Nov. 30, 2007, for Chinese application 2006100092672.

(Continued)

*Primary Examiner* — Basia Ridley
*Assistant Examiner* — Jonathan G Leong
(74) *Attorney, Agent, or Firm* — Christie, Parker & Hale, LLP

(57) ABSTRACT

An organic electrolytic solution and a lithium battery employing the same are provided. The organic electrolytic solution includes a lithium salt, an organic solvent containing a first solvent having a high dielectric constant and a second solvent having a low boiling point, and a surfactant including a hydrophobic portion having an aromatic group. The organic electrolytic solution effectively prevents the electrolytic solution from contacting the anode, thereby suppressing side reactions on the anode surface and improving discharge capacity, charge/discharge efficiency, lifespan, and battery reliability.

7 Claims, 3 Drawing Sheets
(2 of 3 Drawing Sheet(s) Filed in Color)

(56) References Cited

U.S. PATENT DOCUMENTS

| | | |
|---|---|---|
| 6,174,628 B1 | 1/2001 | Umemoto et al. |
| 6,960,410 B2 | 11/2005 | Kim et al. |
| 2003/0170547 A1 | 9/2003 | Kim et al. |
| 2004/0002438 A1 | 1/2004 | Hawkins et al. |
| 2004/0082843 A1 | 4/2004 | Menon |
| 2004/0096750 A1 | 5/2004 | Kim et al. |
| 2004/0185347 A1 | 9/2004 | Kim et al. |
| 2007/0020529 A1 | 1/2007 | Ryu et al. |

FOREIGN PATENT DOCUMENTS

| | | |
|---|---|---|
| CN | 1531134 A | 9/2004 |
| JP | 08190912 | 7/1996 |
| JP | 09-092280 | 4/1997 |
| JP | 11121418 A | 4/1999 |
| JP | 11126633 | 5/1999 |
| JP | 11-354104 | 12/1999 |
| JP | 2001-043900 | 2/2001 |
| JP | 2001-118578 | 4/2001 |
| JP | 2002-33118 | 1/2002 |
| JP | 2003-197263 | 7/2003 |
| JP | 2004-186035 | 7/2004 |
| JP | 2002-319433 | 10/2005 |
| KR | 1020040043228 | 5/2004 |
| WO | WO 2004088769 | 10/2004 |

OTHER PUBLICATIONS

Chinese Registration Determination Certificate dated Oct. 14, 2009.
CN Office Action dated Apr. 4, 2008 for corresponding CN App. 2006101061667 for copending App. 11488215.
Japanese Office action dated Jul. 21, 2009, for corresponding Japanese application 2006-042628.
JP Office Action dated Nov. 10, 2009 for corresponding JP App. 2006-189761 for copending App. 11488215.
JP 11121418A Machine Translation, published to Kitazawa Apr. 1999.
JP 2004-186035A Machine Translation, published to Nishino Jul. 2004.
KIPO Office action dated Jan. 29, 2010, for priority Korean Patent application 10-2005-0130616.
Kissa, E., Fluorinated Surfactants and Repellants, Copyright 2001, Marcel Dekker, Inc., Surfactant Science Series vol. 97, p. 2.
Megahed, et al., *Lithium-ion Rechargeable Batteries*, Journal of Power Sources, 51 (1994) 79-104.
SIPO Certificate of Patent, dated Jun. 23, 2010, for Chinese Patent application 200610106166.7.
Yang, et al., *Composition Analysis of the Passive Film on the Carbon Electrode of a Lithium-ion Battery with an EC-based Electrolyte*, Journal of Power Sources 72 (1998) 66-70.

\* cited by examiner

ORGANIC ELECTROLYTIC SOLUTION WITH SURFACTANT AND LITHIUM BATTERY EMPLOYING THE SAME

CROSS-REFERENCE TO RELATED PATENT APPLICATION

This application is a divisional of U.S. patent application Ser. No. 11/357,429, filed Feb. 17, 2006, which claims priority to and the benefit of Korean Patent Application No. 10-2005-0013526, filed on Feb. 18, 2005, Korean Patent Application No. 10-2005-0070970, filed on Aug. 3, 2005, and Korean Patent Application No. 10-2005-0130616, filed on Dec. 27, 2005, each filed in the Korean Intellectual Property Office, the entire content of all of which is incorporated herein by reference.

FIELD OF THE INVENTION

The present invention relates to lithium batteries. More particularly, the invention relates to organic electrolytic solutions which suppress side reactions on the surfaces of anodes, thereby maintaining reliability of charging and discharging reactions.

BACKGROUND OF THE INVENTION

Portable electronic devices, such as video cameras, cellular phones, notebook computers, etc., are becoming more lightweight and demanding increasingly high performance. As a result, more research is being conducted into batteries for use as power supplies for such portable devices. In particular, rechargeable lithium secondary batteries are actively being researched because they have 3 times as much energy density per unit weight as conventional lead storage batteries, nickel-cadmium batteries, nickel-hydrogen batteries, nickel-zinc batteries, etc., and can be rapidly charged.

In lithium ion batteries, transition metal compounds such as $LiNiO_2$, $LiCoO_2$, $LiMn_2O_4$, $LiFePO_4$, $LiNi_xCO_{1-x}O_2$ (x=1, 2), $Ni_{1-x-y}Co_xMn_yO_2$ ($0 \leq y \leq 0.5$, $0 \leq y \leq 0.5$) and lithium oxides thereof can be used as cathode active materials. Lithium metals, lithium alloys, carbonaceous materials, graphite materials, etc. can be used as anode active materials.

Electrolytes can be classified as liquid electrolytes or solid electrolytes. Liquid electrolytes present risks of fire due to leakage of the electrolytic solution and battery breakage due to vaporization of the electrolytic solution. However, solid electrolytes do not leak and can be easily processed. A lot of research has been conducted into solid electrolytes, such as solid polymer electrolytes. Solid polymer electrolytes can be classified as complete solid electrolytes containing no organic electrolytic solution or gel-type electrolytes containing organic electrolytic solution.

Lithium batteries are generally driven at high operating voltages. Accordingly, conventional aqueous electrolytic solutions cannot be used because the aqueous solution vigorously reacts with the lithium contained in the anode. In place of aqueous electrolytic solutions, organic electrolytic solutions in which lithium salts are dissolved in organic solvents are used. Organic solvents having high ionic conductivity, high dielectric constants and low viscosity are used. Since it is difficult to find a single organic solvent having all of these characteristics, a mixed solvent is generally used. For example, the mixed solvent can include an organic solvent with a high dielectric constant and an organic solvent with a low dielectric constant. Alternatively, the mixed solvent can include an organic solvent with a high dielectric constant and an organic solvent with a low viscosity.

Lithium secondary batteries form passivation layers such as solid electrolyte interface (SEI) films on the negative electrode surfaces upon initial charging. The SEI films are formed by the reaction of carbon in the anode with the electrolytic solution. The SEI film enables stable charging and discharging of the battery without further decomposition of the electrolytic solution (*J. Power Sources,* 51 (1994), 79-104). Also, the SEI film acts as an ion tunnel through which only lithium ions pass. The film solvates the lithium ions to prevent co-intercalation of the organic solvent, which moves with the lithium ions into the carbonaceous anode, thereby preventing breakdown of the anode structure.

However, upon initial charging, gas is generated inside the battery due to decomposition of the carbonate-based organic solvent during formation of the SEI film. This gas generation results in an increase in battery thickness (*J. Power Sources,* 72 (1998), 66-70). When the lithium battery is stored at high temperatures after charging, the passivation layer gradually breaks down due to electrochemical energy and thermal energy which increases over time. The breakdown of the passivation layer exposes the anode surface, causing the amount of gas generated to increase. The generation of gas also causes the internal pressure of the battery to increase, which causes deformation of the central portion of the side of the battery (such as swelling of a rectangular lithium polymer battery in a certain direction). The increased internal pressure of the battery results in decreased adherence between electrode plates, thereby reducing the performance and safety of the battery and making the mounting of a set of lithium secondary batteries difficult.

To address these concerns, surfactants have been proposed for use in the electrolytic solution. However, the surfactants used generally include alkyl groups as nonpolar groups for the hydrophobic parts, and ionic groups or the like as polar groups. The anode mainly comprises carbon-based material having repeating aromatic group structures. The electrolyte mainly includes a carbonate-based solvent. When a conventional surfactant is used at the interface between the anode and electrolyte good active surface properties are not observed due to the differences between the structure of the surfactant and the structure of the medium. Thus, conventional surfactants do not provide a good barrier between the negative electrode and the electrolyte and do not adequately assist the re-impregnation of a squeezed electrolyte. Therefore, a need exists for a surfactant which displays improved active surface properties in non-aqueous environments.

SUMMARY OF THE INVENTION

In one embodiment of the present invention, an organic electrolytic solution suppresses side reactions during repeated charge/discharge cycles, thereby improving battery reliability.

In another embodiment, a lithium battery employs the electrolytic solution.

According to one embodiment of the present invention, an organic electrolytic solution includes a lithium salt, an organic solvent containing a first solvent having a high dielectric constant and a second solvent having a low boiling point, and a surfactant including a hydrophobic portion having an aromatic group and a hydrophilic portion. The aromatic group may be an aryl group having 6 to 30 carbon atoms or a heteroaryl group having 2 to 30 carbon atoms. At least one hydrogen atom of the aryl group or the heteroaryl group may be substituted by at least one functional group selected from the group consisting of halogen atoms and alkyl groups having 1 to 20 carbon atoms. The aryl group having 6 to 30 carbon atoms may be phenyl groups, indenyl groups, naphthalenyl groups, phenanthrenyl groups, anthracenyl groups or pyrenyl groups. The heteroaryl group having 2 to 30 carbon atoms may be pyrrolyl groups, thiophenyl groups, imidazolyl groups, pyrazolyl groups, furanyl groups, isothiazolyl groups, pyranyl groups, isoxazolyl groups, pyridinyl groups, purinyl groups, pyrazinyl groups, quinolizinyl groups, pyrimidinyl groups, quinolinyl groups, pyridazinyl groups, indolyl groups, carbazolyl groups, or phenazinyl groups.

The hydrophilic portion of the surfactant may be an alkyloxycarbonyl group (RO—(C=O)—), a carboxy group (HO—(C=O)—), a carbonyl group (—(C=O)—), a dithiocarboxy group (HS—(C=S)—), a thiocarboxy group (HO—(C=S)—), a hydroxy group (HO—) or an oxyalkylene group (—R$^1$—O—). The alkyl group (R—) may be a linear or branched alkyl having 1 to 20 carbon atoms and the alkylene (—R$^1$—) may be a linear or branched alkylene having 2 to 20 carbon atoms.

The surfactant may comprises a compound represented by any one of Formulae (1) through (3):

$$Y\text{-}[A]_a\text{-}(CH_2)_m\text{—}X \quad (1)$$

$$Y\text{-}[A]_a\text{-}[B]_b\text{—}(CH_2)_m\text{—}X \quad (2)$$

$$Y\text{-}[A]_a\text{-}[B]_b\text{—}[C]_c\text{—}(CH_2)_m\text{—}X \quad (3)$$

In Formulae (1) through (3), X is a (hetero)aryl group selected from the group consisting of phenyl groups and imidazolyl groups, Y is a substituent selected from the group consisting of hydrogen atoms and methoxy groups, each of A, B and C is a repeating unit selected from the group consisting of oxyethylene, oxypropylene, oxybutylene,

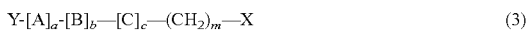

each of a, b, and c is an integer ranging from 1 to 100 wherein a+b+c ranges from 1 to 300, m is an integer ranging from 0 to 5, and R is an alkyl group as defined above.

At least one hydrogen atom of the (hetero)aryl group represented by X may be substituted by a functional group selected from the group consisting of halogen atoms, alkyl groups having 1 to 20 carbon atoms and combinations thereof.

The surfactant may be selected from the group consisting of compounds represented by Formulae (4) through (10) below.

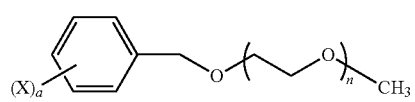

(4)

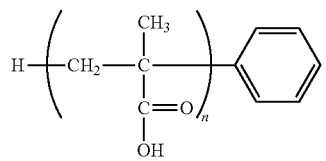

(5)

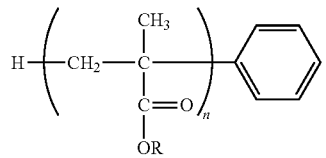

(6)

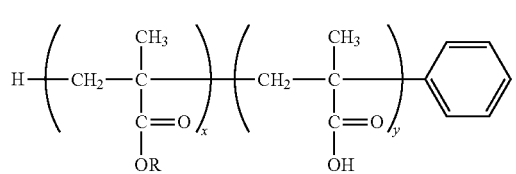

(7)

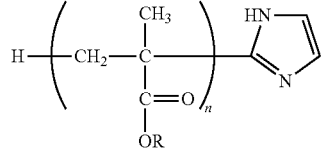

(8)

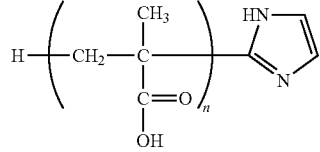

(9)

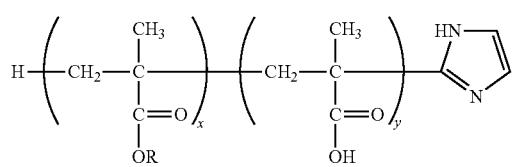

(10)

In Formulae (4) through (10), X is a halogen atom, a is an integer ranging from 0 to 5, n is an integer ranging from 1 to 100, each of x and y is an integer ranging from 1 to 100 where x+y ranges from 1 to 200, and R is an alkyl group as defined above.

The surfactant may be present in the organic solvent in an amount ranging from about 0.1 to about 10% by weight based on the total weight of the organic solvent.

The lithium salt is present in the electrolytic solution in a concentration ranging from about 0.5 to about 2.0 M.

The first solvent having a high dielectric constant may include a solvent selected from the group consisting of ethylene carbonate, propylene carbonate, butylene carbonate, γ-butyrolactone and combinations thereof.

The second solvent having a low boiling point may include a solvent selected from the group consisting of dimethyl carbonate, ethylmethyl carbonate, diethyl carbonate, dipropyl carbonate, dimethoxyethane, diethoxyethane, fatty acid ester derivatives and combinations thereof.

According to another embodiment of the present invention, a lithium battery includes a cathode, an anode, and the organic electrolytic solution described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the present invention will become more apparent by reference to the following detailed description when considered in conjunction with the attached drawings in which.

DETAILED DESCRIPTION OF THE INVENTION

Figure 1:
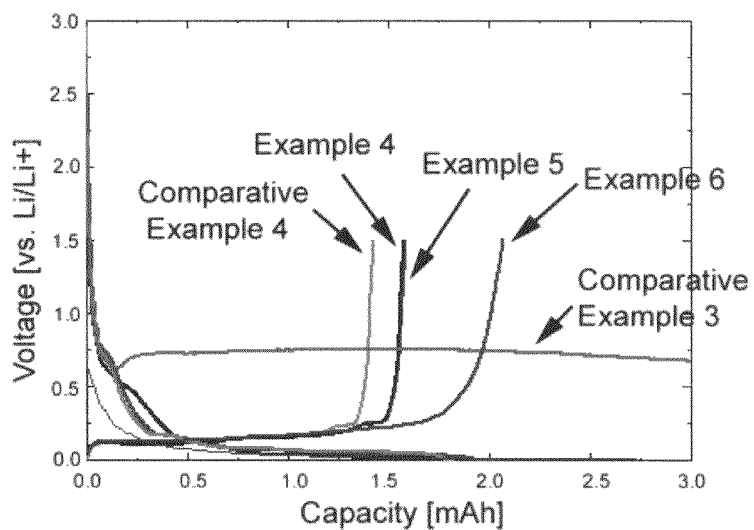
FIG. 1 is a graph illustrating charge and discharge characteristics of lithium batteries employing organic electrolytic solutions according to Examples 4 through 6 and Comparative Examples 3 and 4.

Throughout the specification, the terms "hydrophilic portion" and "hydrophobic portion" refer to an affinity to a solvent rather than to water. These terms are used to avoid confusion, and the contents of these "hydrophobic" and "hydrophilic" portions are those known in the surfactant field.

Conventional surfactants include alkyl groups as the hydrophobic portions and ionic groups or the like as the hydrophilic portions. These surfactants are therefore limited in their activity at the interface between the electrolyte and the anode in a battery. Unlike conventional surfactants, an organic surfactant according to one embodiment of the present invention includes a hydrophobic portion having an aromatic group and a hydrophilic portion having a carbonyl group. This surfactant has good affinity to each medium in a battery system, which has a non-aqueous electrolyte and a carbon-based anode. The surfactant also has better active surface properties at the interface between the media, thereby effectively suppressing side reactions on the anode surface and improving battery reliability.

An organic electrolytic solution according to one embodiment of the present invention includes a lithium salt, an organic solvent containing a first solvent having a high dielectric constant and a second solvent having a low boiling point, and a surfactant including a hydrophobic portion having an aromatic group.

When a surfactant including a hydrophobic portion having only an aromatic group is used with a carbon-based anode (such as graphite) having a repeated benzene structure, the aromatic group of the hydrophobic portion has good affinity to the carbon-based anode.

The aromatic group of the hydrophobic portion is more electrically stable than simple cyclic compounds because the number of electrons present in the π-orbital (i.e. π-electrons) is [4n+2], in which n is 1 or greater. Thus, the aromatic group has several physical properties different from those of cyclic compounds having relatively low chemical reactivity. The π-orbital in the aromatic group is delocalized, and when it overlaps a delocalized π-orbital in the surface of the graphite, resonance occurs enabling the π-electrons to occupy many positions in a single space. This increased number of electron arrangements forms a more electronically stable structure. Accordingly, a surfactant having a hydrophobic portion overlapping a carbon-based electrode is more stable than a surfactant having an alkyl group as the hydrophobic portion.

In addition, when aromatic benzene rings having similar structures are closely located, they easily adsorb due to Van der Waals forces. For this reason, the surfactant is densely and tightly adsorbed to the surface of the carbon-based anode where it reacts with solvent molecules through an electrochemical reduction on the anode surface to modify the SEI on the anode surface. Due to the high density of the surfactant adsorbed to the anode surface, side reactions between the anode surface and the electrolyte are suppressed, thereby improving battery reliability and preventing reductions in the lifespan of the battery due to decomposition of the electrolyte.

The aromatic group may be an aryl group having 6 to 30 carbon atoms or a heteroaryl group having 2 to 30 carbon atoms. The aryl group can be a single aryl group or a combination of aryl groups and comprises a carbocyclic aromatic system having 6 to 30 carbon atoms and including one or more rings. The rings may be attached or fused together using a pendent method. The term "homoaryl" includes, but is not restricted to, aromatic radicals such as phenyl groups, naphthyl groups, tetrahydronaphthyl groups, indane groups and biphenyl groups. In one embodiment, the aryl group is selected from the group consisting of phenyl groups, indenyl groups, naphthalenyl groups, phenanthrenyl groups, anthracenyl groups, and pyrenyl groups.

The heteroaryl group is a monovalent, monocyclic or bicyclic aromatic radical having 2 to 30 carbon atoms and 1, 2 or 3 hetero atoms selected from the group consisting of N, O and S. For example, the heteroaryl group may be a monovalent, monocyclic or bicyclic aromatic radical in which at least one of the hetero atoms is oxidized or quaternarized to form, for example, a N-oxide or a quaternary salt. Nonlimiting examples of suitable heteroaryl groups include thienyl groups, benzothienyl groups, pyridyl groups, pyrazinyl groups, pyrimidinyl groups, pyridazinyl groups, quinolinyl groups, quinoxalinyl groups, imidazolyl groups, furanyl groups, benzofuranyl groups, thiazolyl groups, isoxazolyl groups, benzisoxazolyl groups, benzimidazolyl groups, triazolyl groups, pyrazolyl groups, pyrolyl groups, indolyl groups, 2-pyridonyl groups, 4-pyridonyl groups, N-alkyl-2-pyridonyl groups, pyrazinonyl groups, pyridazynonyl groups, pyrimidinonyl groups, oxazolonyl groups, corresponding N-oxides thereof (e.g., pyridyl N-oxide, quinolinyl N-oxide), and quaternary salts thereof. In one embodiment, the heteroaryl group having 2 to 30 carbon atoms is selected from the group consisting of pyrrolyl groups, thiophenyl groups, imidazolyl groups, pyrazolyl groups, furanyl groups, isothiazolyl groups, pyranyl groups, isoxazolyl groups, pyridinyl groups, purinyl groups, pyrazinyl groups, quinolizinyl groups, pyrimidinyl groups, quinolinyl groups, pyridazinyl groups, indolyl groups, carbazolyl groups and phenazinyl groups.

At least one hydrogen atom of the aryl group or the heteroaryl group may be substituted by at least one functional group selected from the group consisting of halogen atoms and alkyl groups having 1-20 carbon atoms. The halogen atom may be F, Cl, Br or I. In one embodiment, the halogen atom is F. In particular, when hydrogen atoms of the aryl group or the heteroaryl group are substituted by F, a fluorine-based surfactant is formed. Fluorine-based compounds are known to have low surface tension (e.g., Teflon) and the fluorine-based surfactant has an enhanced ability to reduce surface tension. As a result, the fluorine-based surfactant easily adsorbs at the interface between the carbon-based anode and the polar solvent. Using halogen atoms increases the number of valence electrons and increases orbital volume, thereby activating the interaction of the halogen atoms with an edge plane, effectively adsorbing the halogen atoms to the carbon-based anode. This adsorption increases electrolyte blockage. Accordingly, the irreversible decomposition of the solvent during the first charge/discharge cycle is more effectively suppressed than when the (hetero)aryl group has only hydrogen atoms.

The hydrophilic portion of the surfactant may include an alkyloxycarbonyl group (RO—(C═O)—), a carboxy group (HO—(C═O)—), a carbonyl group (—(C═O)—), a dithiocarboxy group (HS—(C═S)—), a thiocarboxy group (HO—(C═S)—), a hydroxy group (HO—) or an oxyalkylene group (—$R^1$—O—). In the hydrophilic portion, the alkyl group (R—) includes a linear or branched radical having 1 to 20 carbon atoms. In one embodiment, the alkyl group includes a linear or branched radical having 1 to 12 carbon atoms. In another embodiment, the alkyl radical is a lower alkyl having 1 to 8 carbon atoms. In yet another embodiment, the alkyl radical is a lower alkyl having 1 to 5 carbon atoms. Nonlimiting examples of suitable alkyl radicals include methyl groups, ethyl groups, n-propyl groups, isopropyl groups, n-butyl groups, isobutyl groups, sec-butyl groups, t-butyl groups, pentyl groups, iso-amyl groups, hexyl groups and the like.

In the hydrophilic portion, the alkylene group (—$R^1$—) can include a linear or branched radical having 2 to 20 carbon atoms. In one embodiment, the alkylene group includes a linear or branched radical having 2 to 10 carbon atoms. In another embodiment, the alkylene radical is a lower alkyl having 2 to 8 carbon atoms. In yet another embodiment, the alkylene radical is a lower alkyl having 2 to 5 carbon atoms. Nonlimiting examples of suitable alkylene radicals include ethylene groups, n-propylene groups, isopropylene groups, n-butylene groups, isobutylene groups, sec-butylene groups, t-butylene groups, pentylene groups, iso-amylene groups, hexylene groups and the like.

The surfactant may be a compound represented by any one of Formulae (1) through (3):

$$Y\text{-}[A]_a\text{-}(CH_2)_m\text{—}X \qquad (1)$$

$$Y\text{-}[A]_a\text{-}[B]_b\text{—}(CH_2)_m\text{—}X \qquad (2)$$

$$Y\text{-}[A]_a\text{-}[B]_b\text{—}[C]_c\text{—}(CH_2)_m\text{—}X \qquad (3)$$

In Formula (1) through (3), X is a (hetero)aryl group selected from the group consisting of phenyl and imidazolyl, Y is a substituent selected from the group consisting of hydrogen atoms and methoxy groups, each of A, B and C is a repeating unit selected from the group consisting of oxyethylene, oxypropylene, oxybutylene,

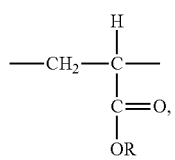, 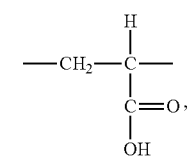

-continued

, and , where each of a, b, and c is an integer ranging from 1 to 100 where a+b+c ranges from 1 to 300, m is an integer ranging from 0 to 5, and R is as defined above.

At least one hydrogen atom in the (hetero)aryl group represented by X may be substituted by at least one functional group selected from the group consisting of halogen atoms and alkyl groups having 1-20 carbon atoms. The halogen atom may be F, Cl, Br or I. In one embodiment, the halogen atom is F.

The surfactant may be selected from compounds represented by Formulae (4) through (10) below.

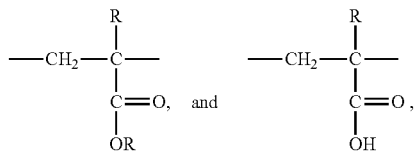 (4)

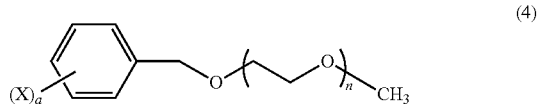 (5)

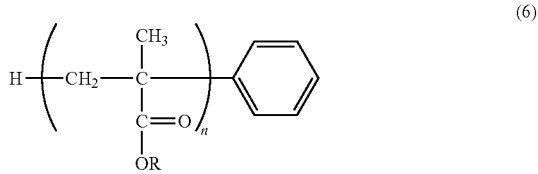 (6)

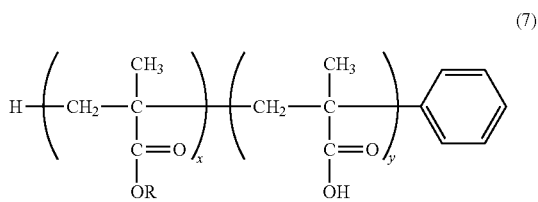 (7)

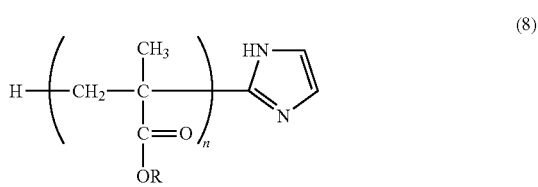 (8)

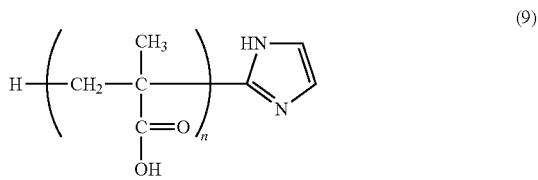 (9)

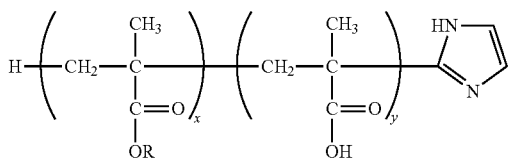

(10)

In Formulae (4) through (10), X is a halogen atom, a is an integer ranging from 0 to 5, n is an integer ranging from 1 to 100, each of x and y is an integer ranging from 1 to 100 where x+y ranges from 1 to 200, and R is as defined above.

The surfactant is present in an amount ranging from about 0.1 to about 10% by weight based on the total weight of the organic solvent. In one embodiment, the surfactant is present in an amount ranging from about 1 to about 3% by weight based on the total weight of the organic solvent. When the surfactant is present in an amount exceeding about 10% by weight, charge/discharge characteristics are poor since there is an insufficient amount of effective material on which battery performance depends. When the surfactant is present in an amount less than about 0.1% by weight, the desired effects are difficult to achieve.

The first solvent having a high dielectric constant may be any such solvent commonly used in the art, for example, cyclic carbonates. Nonlimiting examples of suitable solvents having high dielectric constants include ethylene carbonate, propylene carbonate, butylene carbonate, γ-butyrolactone and the like.

The solvent having a low boiling point may be any such solvent commonly used in the art, for example, aliphatic carbonates. Nonlimiting examples of suitable solvents having low boiling points include dimethyl carbonate, ethylmethyl carbonate, diethyl carbonate, dipropyl carbonate, dimethoxyethane, diethoxyethane, fatty acid ester derivatives and the like.

The first solvent having a high dielectric constant and the second solvent having a low boiling point are provided in a volume ratio ranging from about 1:1 to about 1:9. When the volume ratio is outside this range, the discharge capacity and charge/discharge cycle life of the battery decreases.

The lithium salt is any lithium salt commonly used in lithium batteries and may include a compound selected from the group consisting of $LiClO_4$, $LiCF_3SO_3$, $LiPF_6$, $LiN(CF_3SO_2)$, $LiBF_4$, $LiC(CF_3SO_2)_3$, $LiN(C_2F_6SO_2)_2$ and mixtures thereof.

The concentration of the lithium salt in the organic electrolytic solution ranges from about 0.5 to about 2.0 M. When the concentration of the lithium salt is less than about 0.5 M, the conductivity of the electrolytic solution is low, thereby degrading the performance of the electrolytic solution. When the concentration of the lithium salt is greater than 2.0 M, the viscosity of the electrolytic solution increases, thereby reducing the mobility of lithium ions.

Figure 5:
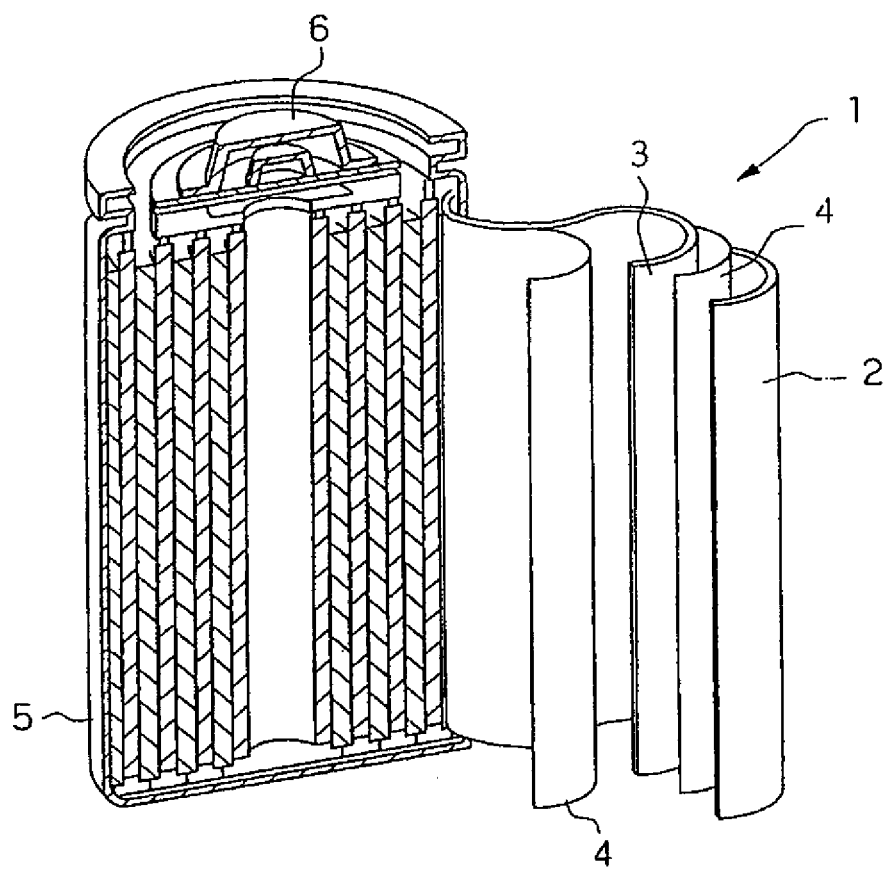
FIG. 5 is a schematic of a lithium battery according to one embodiment of the present invention.

As shown in FIG. 5, a lithium battery 1 according to one embodiment of the present invention includes a cathode 2, an anode 3, and the organic electrolytic solution described above. The lithium battery may be a lithium primary battery or a lithium secondary battery, such as a lithium ion battery, a lithium ion polymer battery, or a lithium sulfur battery.

The lithium battery according to this embodiment is manufactured by first mixing a cathode active material, a conductive agent, a binder and a solvent to prepare a cathode active material composition. The cathode active material composition is then directly coated on an Al current collector and dried to prepare a cathode plate. Alternatively, the cathode active material composition is cast on a separate substrate to form a film which is then laminated on the Al current collector to prepare a cathode plate.

The cathode active material can be any lithium containing metal oxide commonly used in the art. Nonlimiting examples of suitable cathode active materials include $LiCoO_2$, $LiMn_xO_{2x}$, $LiNi_{1-x}Mn_xO_{2x}$ (x=1, 2), $Ni_{1-x-y}Co_xMn_yO_2$ (0≦x≦0.5, 0≦y≦0.5), and the like.

One nonlimiting example of a suitable conductive agent is carbon black.

Non limiting examples of suitable binders include vinylidene fluoride/hexafluoropropylene copolymers, polyvinylidene fluoride, polyacrylonitrile, polymethylmethacrylate, polytetrafluoroethylene and mixtures thereof. Styrene butadiene rubber-based polymers may also be used as the binder.

Nonlimiting examples of suitable solvents include N-methylpyrrolidone, acetone, water and the like.

The cathode active material, conducting agent, binder and solvent are used in amounts commonly used in lithium batteries.

An anode active material, a conductive agent, a binder and a solvent are then mixed to prepare an anode active material composition. The anode active material composition is directly coated on a Cu current collector to form an anode plate. Alternatively, the anode active material composition is cast on a separate substrate to form a film which is then laminated on the Cu current collector to form the anode plate. The anode active material, conducting agent, binder and solvent are used in amounts commonly used in lithium batteries.

Nonlimiting examples of suitable materials for use as the anode active material include lithium metals, lithium alloys, carbonaceous materials and graphite.

The conductive agent, binder and solvent in the anode active material composition are the same as those in the cathode active material composition.

If desired, a plasticizer may be added to the cathode active material composition and the anode active material composition to produce pores inside the electrode plates.

The lithium battery further comprises a separator 4 positioned between the anode 3 and cathode 22. The separator 4 may be made of any material commonly used in lithium batteries. For example, a material having low resistance to the movement of the ions of the electrolyte and a good ability to absorb the electrolytic solution can be used. The material may be a non-woven or woven fabric selected from the group consisting of glass fibers, polyester, Teflon, polyethylene, polypropylene, polytetrafluoroethylene (PTFE) and combinations thereof. In lithium ion batteries, windable separators comprising polyethylene, polypropylene, or the like are used. In lithium ion polymer batteries, separators capable of impregnating organic electrolytic solutions are used.

The separator is prepared by mixing a polymer resin, a filler and a solvent to prepare a separator composition. The separator composition is directly coated on an electrode and dried to form a separator film. Alternatively, the separator composition is cast on a substrate and dried to form a film which is then peeled from the substrate and laminated on an electrode.

The polymer resin can be any material used in conventional binders for electrode plates. Nonlimiting examples of suitable polymer resins include vinylidenefluoride/hexafluoropropylene copolymers, polyvinylidenefluoride, polyacrylonitrile, polymethylmethacrylate and mixtures thereof. In particular, vinylidenefluoride/hexafluoropropylene copolymers containing from about 8 to about 25% by weight of hexafluoropropylene can be used.

The separator 4 is positioned between the cathode plate 2 and the anode plate 3 to form an electrode assembly. The electrode assembly is wound or folded and placed in a cylindrical or rectangular battery case 5. Then, the organic electrolytic solution is injected into the battery case 5, and the battery case 5 is sealed with a cap assembly 6 to complete the lithium ion battery.

Alternatively, the cell structures are stacked to form a bi-cell and the organic electrolytic solution is impregnated therein. Then, the resultant structure is placed in a pouch and sealed to complete a lithium ion polymer battery.

The following examples illustrate certain exemplary embodiments of the present invention. However, these examples are presented for illustrative purposes only and the present invention is not limited by these examples.

Example 1

Preparation of Electrolytic Solution

1% by weight of a compound represented by formula (11) was added to an organic solvent mixture containing 30% by volume of propylene carbonate and 70% by volume of dimethyl carbonate. 1M $LiPF_6$ was used as a lithium salt to prepare an organic electrolytic solution:

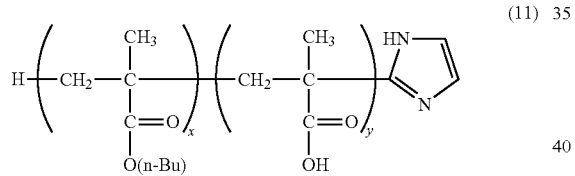

(11)

In Formula II, x is 1 and y is 1.

Example 2

Preparation of Electrolytic Solution

An organic electrolytic solution was prepared as in Example 1, except that 1% by weight of a compound represented by formula (12) was used instead of the compound represented by formula (11):

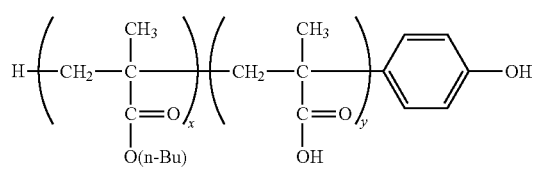

(12)

In Formula 12, x is 1 and y is 1.

Example 3

Preparation of Electrolytic Solution

An organic electrolytic solution was prepared as in Example 1, except that 1% by weight of a compound represented by formula (13) was used instead of the compound represented by formula (11):

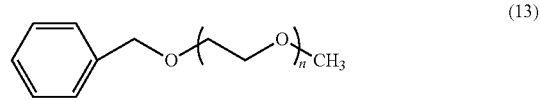

(13)

In Formula 13, n ranges from 7 to 8.

Comparative Example 1

Preparation of Electrolytic Solution

An organic solvent mixture containing 30% by volume of propylene carbonate and 70% by volume of dimethyl carbonate and 1M $LiPF_6$ as a lithium salt were used to prepare an organic electrolytic solution without a surfactant.

Comparative Example 2

Preparation of Electrolytic Solution

1% by weight of triton X100 represented by formula (14) was added to an organic solvent mixture containing 30% by volume of propylene carbonate and 70% by volume of dimethyl carbonate. 1M $LiPF_6$ as a lithium salt was added to the solvent mixture to prepare an organic electrolytic solution:

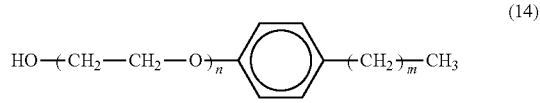

(14)

In Formula 14, n is 10 and m is 7.

Example 4

Manufacturing of Half Cell

96% by weight of a graphite-based powder (NICABEAD, available from Nippon Carbon Co., Ltd., average particle diameter: 25 μm) as an active material, 4% by weight of PVdF as a binder and 100 ml of NMP (N-methylpyrrolidone) were mixed. Then, ceramic balls were placed in the mixture and the resulting mixture was blended for about 10 hours. The mixture was then cast on a 19 μm thick Cu foil at intervals of 300 μm with a doctor blade to form a carbon-based electrode. The carbon-based electrode was placed in an oven at 90° C. and dried for about 10 hours to thoroughly evaporate the NMP. Then, the electrode was roll-pressed to obtain a 120 μm thick carbon-based electrode.

Lithium was used to form a counter electrode.

A 20 μm thick polyethylene/polypropylene microporous membrane (Hoest Chellanese, USA) was used as a separator.

The separator was positioned between the electrodes. The resulting structure was pressed and placed in a can. A half cell was fabricated by injecting the electrolytic solution prepared in Example 1 into the can.

Example 5

Manufacturing of Half Cell

A half cell was fabricated as in Example 4 except that the electrolytic solution prepared in Example 2 was injected into the can.

Example 6

Manufacturing of Half Cell

A half cell was fabricated as in Example 4 except that the electrolytic solution prepared in Example 3 was injected into the can.

Comparative Example 3

Manufacturing of Half Cell

A half cell was manufactured as in Example 4, except that the organic electrolytic solution prepared in Comparative Example 1 was injected into the can.

Comparative Example 4

Manufacturing of Half Cell

A half cell was manufactured as in Example 4, except that the organic electrolytic solution of Comparative Example 2 was injected into the can.

Experimental Example 1

Charge and Discharge Characteristics of Battery

The Li electrodes of the half cells of Examples 4 through 6 and Comparative Examples 3 and 4 were charged with a constant current of 50 mA per 1 g of the active material until the cells reached 0.001 V. Then, a constant voltage charge was performed until the current was reduced to 5 mA per 1 g of the active material at a voltage of 0.001 V.

The half cells of Examples 4 through 6 and Comparative Examples 3 and 4 were then subjected to a charge/discharge cycle and the results are illustrated in FIG. 1. The half cell of Comparative Example 3, in which the organic electrolytic solution contained no additive, showed irreversibly decomposition of the electrolyte, and charging/discharging was impossible. However, the half cells of Examples 4 through 6 and Comparative Example 4 had low voltage in broad capacity ranges during charging/discharging. In particular, Examples 4 and 5 each had a 20% higher discharge capacity than Comparative Example 4, and Example 6 had a 40% higher discharge capacity than Comparative Example 4. This is because the surfactant of the present invention is more densely and strongly adsorbed to the interface, thereby suppressing side reactions such as decomposition of the electrolyte on the anode surface and enabling transfer of most electrons to an external circuit.

Example 7

Preparation of Electrolytic Solution 0.5% by weight of a compound represented by formula (15) was added to an organic solvent mixture containing 30% by volume of propylene carbonate and 70% by volume of dimethyl carbonate. 1M $LiPF_6$ was used as a lithium salt to prepare an organic electrolytic solution:

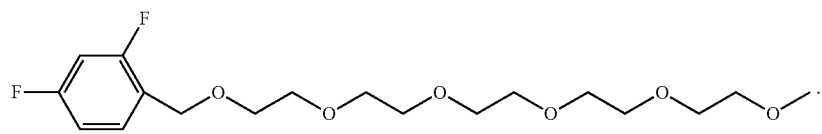

(15)

Example 8

Preparation of Electrolytic Solution

An organic electrolytic solution was prepared as in Example 7, except that 1% by weight of the compound represented by formula (15) was added.

Example 9

Preparation of Electrolytic Solution

An organic electrolytic solution was prepared as in Example 7, except that 5% by weight of the compound represented by formula (15) was added.

Example 10

Preparation of Electrolytic Solution

An organic electrolytic solution was prepared as in Example 7, except that 10% by weight of the compound represented by formula (15) was added.

Example 11

Preparation of Electrolytic Solution 0.5% by weight of a compound represented by formula (13) was added to an organic solvent mixture containing 30% by volume of propylene carbonate and 70% by volume of dimethyl carbonate. 1M $LiPF_6$ as a lithium salt was used to prepare an organic electrolytic solution:

$$\text{C}_6\text{H}_5\text{-CH}_2\text{-O-(CH}_2\text{CH}_2\text{-O)}_n\text{-CH}_3 \quad (13)$$

In Formula (13), n ranges from 7 to 8.

Example 12

Preparation of Electrolytic Solution

An organic electrolytic solution was prepared as in Example 11, except that 1% by weight of the compound represented by formula (13) was added.

Example 13

Preparation of Electrolytic Solution

An organic electrolytic solution was prepared as in Example 11, except that 5% by weight of the compound represented by formula (13) was added.

Example 14

Preparation of Electrolytic Solution

An organic electrolytic solution was prepared as in Example 11, except that 10% by weight of the compound represented by formula (13) was added.

Example 15

Manufacturing of Half Cell

96% by weight of a graphite-based powder (NICABEAD, available from Nippon Carbon Co., Ltd., average particle diameter: 25 μm) as an active material, 4% by weight of PVdF as a binder and 100 ml of NMP were mixed. Then, ceramic balls were placed in the mixture and the resulting mixture was blended for about 10 hours. The mixture was then cast on a 19 μm thick Cu foil at intervals of 300 μm with a doctor blade to obtain a carbon-based electrode. The carbon-based electrode was placed in an oven at 90° C. and dried for about 10 hours to thoroughly evaporate the NMP. Then, the electrode was roll-pressed to obtain a 120 μm thick carbon-based electrode.

Lithium was used to form a counter electrode.

A 20 μm thick polyethylene/polypropylene microporous membrane (Hoest Cellanese, USA) was used as a separator.

The separator was positioned between the electrodes. The resulting structure was pressed and put in a can. The electrolytic solution prepared in Example 7 was then injected into the can to provide a half cell.

Example 16

Manufacturing of Half Cell

A half cell was prepared as in Example 15, except that the electrolytic solution prepared in Example 8 was injected into the can.

Example 17

Manufacturing of Half Cell

A half cell was prepared as in Example 15, except that the electrolytic solution prepared in Example 9 was injected into the can.

Example 18

Manufacturing of Half Cell

A half cell was prepared as in Example 15, except that the electrolytic solution prepared in Example 10 was injected into the can.

Example 19

Manufacturing of Half Cell

A half cell was manufactured as in Example 15, except that the organic electrolytic solution prepared in Example 11 was injected into the can.

Example 20

Manufacturing of Half Cell

A half cell was manufactured as in Example 15, except that the organic electrolytic solution prepared in Example 12 was injected into the can.

Example 21

Manufacturing of Half Cell

A half cell was manufactured as in Example 15, except that the organic electrolytic solution prepared in Example 13 was injected into the can.

Example 22

Manufacturing of Half Cell

A half cell was manufactured as in Example 15, except that the organic electrolytic solution prepared in Example 22 was injected into the can.

Experimental Example 2

Charge and Discharge Characteristics of Battery

The Li electrodes of the half cells of Examples 15 through 22 were charged with a constant current of 50 mA per 1 g of the active material until the cells reached 0.001 V. Then, a constant voltage charge was performed until the current was reduced to 5 mA per 1 g of the active material at a voltage of 0.001 V. The results are illustrated in FIGS. 2 and 3 and in Table 1 below.

TABLE 1

|  | Li charging (mAh) | Li discharging (mAh) | Efficiency (%) | Li charging (mAh) | Li discharging (mAh) | Efficiency (%) |
| --- | --- | --- | --- | --- | --- | --- |
| Example 15 | 22.6 | 14.6 | 64.6 | 20.31 | 12.29 | 60.5 |
| Example 16 | 21.96 | 14.5 | 66.0 | 8.85 | 3.09 | 34.9 |
| Example 17 | 17.84 | 15.22 | 85.3 | 17.86 | 15.19 | 85.1 |
| Example 18 | 17.98 | 14.67 | 81.4 | 18.71 | 15.24 | 81.5 |
| Example 19 | 21.1 | 12.5 | 59.2 | 19.1 | 11.76 | 61.6 |
| Example 20 | 25.27 | 16.06 | 63.6 | 24.66 | 15.43 | 62.6 |
| Example 21 | 20.57 | 13.85 | 67.3 | 21.146 | 14.4 | 68.1 |
| Example 22 | 15.94 | 10.85 | 68.1 | 17.3 | 12.2 | 70.5 |

Figure 2:
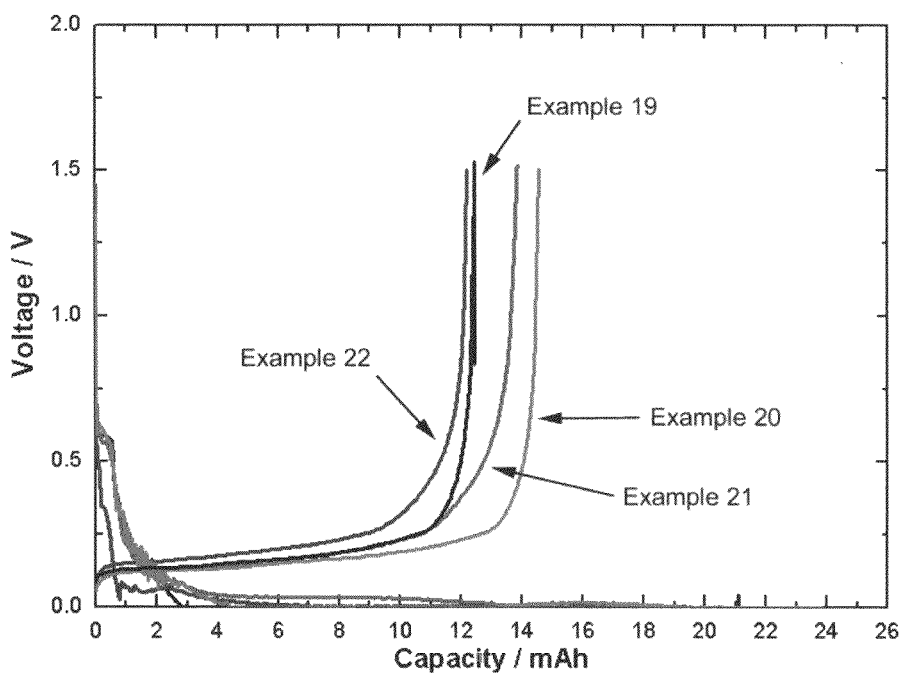
FIG. 2 is a graph illustrating charge and discharge characteristics of lithium batteries employing organic electrolytic solutions according to Examples 19 through 22.
Figure 3:
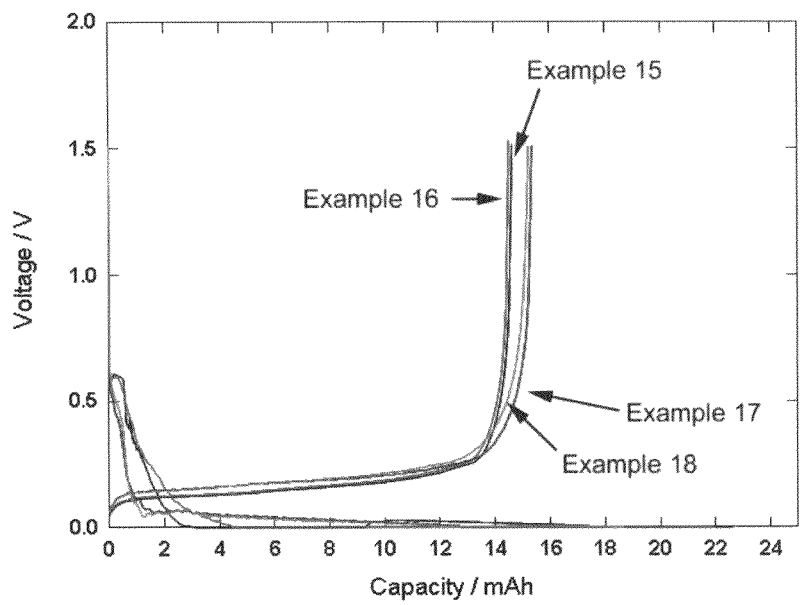
FIG. 3 is a graph illustrating charge and discharge characteristics of lithium batteries employing organic electrolytic solutions according to Examples 15 through 18.

Referring to FIGS. 2 and 3, the half cells of Examples 15 through 18 (in which the aryl groups are substituted with halogen atoms) had improved discharge efficiency compared to the half cells of Examples 19 through 22 (in which the aryl groups are not substituted with halogen atoms). Initial charge and discharge capacities of the half cells of Examples 15 through 18 and Examples 19 through 22 were measured twice, and the discharge efficiencies are listed in Table 1. Referring to Table 1, the discharge efficiencies of the half cells of Examples 15 through 18 increased up to 85%. It is believed that this increase in discharge efficiency results from strong adsorption of the surfactant to the carbon-based electrode due to the halogen substitution, as described above.

Example 23

Preparation of Electrolytic Solution 0.5% by weight of a compound represented by formula (16) was added to an organic solvent mixture containing 30% by volume of propylene carbonate and 70% by volume of dimethyl carbonate. 1M $LiPF_6$ was used as a lithium salt to prepare an organic electrolytic solution:

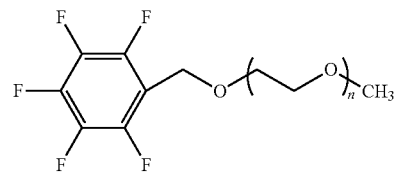

(16)

In Formula 16, n is 8.

Example 24

Preparation of Electrolytic Solution

An organic electrolytic solution was prepared as in Example 23, except that 1% by weight of the compound represented by formula (16) was added.

Example 25

Preparation of Electrolytic Solution

An organic electrolytic solution was prepared as in Example 23, except that 5% by weight of the compound represented by formula (16) was added.

Example 26

Preparation of Electrolytic Solution

An organic electrolytic solution was prepared as in Example 23, except that 10% by weight of the compound represented by formula (16) was added.

Example 27

Manufacturing of Half Cell

96% by weight of a graphite-based powder (NICABEAD, available from Nippon Carbon Co., Ltd., average particle diameter: 25 μm) as an active material, 4% by weight of PVdF as a binder and 100 ml of NMP were mixed. Then, ceramic balls were placed in the mixture and the resulting mixture was blended for about 10 hours. The mixture was cast on a 19 μm thick Cu foil at intervals of 300 μm with a doctor blade to obtain a carbon-based electrode. The carbon-based electrode was placed in an oven at 90° C. and dried for about 10 hours to thoroughly evaporate the NMP. Then, the electrode was roll-pressed to obtain a 120 μm thick carbon-based electrode.

Lithium was used to form a counter electrode.

A 20 μm thick polyethylene/polypropylene microporous membrane (Hoest Chellanese, USA) was used as a separator.

The separator was positioned between the electrodes. The resulting structure was pressed and put into a can. The electrolytic solution prepared in Example 23 was then injected into the can to provide a half cell.

Example 28

Manufacturing of Half Cell

A half cell was manufactured as in Example 27, except that the electrolytic solution prepared in Example 24 was injected into the can.

Example 29

Manufacturing of Half Cell

A half cell was manufactured as in Example 27, except that the electrolytic solution prepared in Example 25 was injected into the can.

Example 30

Manufacturing of Half Cell

A half cell was manufactured as in Example 27, except that the electrolytic solution prepared in Example 25 was injected into the can.

Experimental Example 3

Charge and Discharge Characteristics of Battery

The Li electrodes of the half cells manufactured in Examples 27 through 30 were charged with a constant current of 50 mA per 1 g of the active material until the cells reached 0.001V. Then, a constant voltage charge was performed until the current was reduced to 5 mA per 1 g of the active material at a voltage of 0.001 V. The results are illustrated in FIG. 4 and in Table 2 below.

TABLE 2

|  | Li charging (mAh) | Li discharging (mAh) | Efficiency (%) |
| --- | --- | --- | --- |
| Example 27 | 20.5 | 14.7 | 71.7 |
| Example 28 | 15.8 | 11.9 | 75.3 |
| Example 29 | 15.6 | 13.9 | 89.1 |
| Example 30 | 16.2 | 14.7 | 90.7 |

Figure 4:
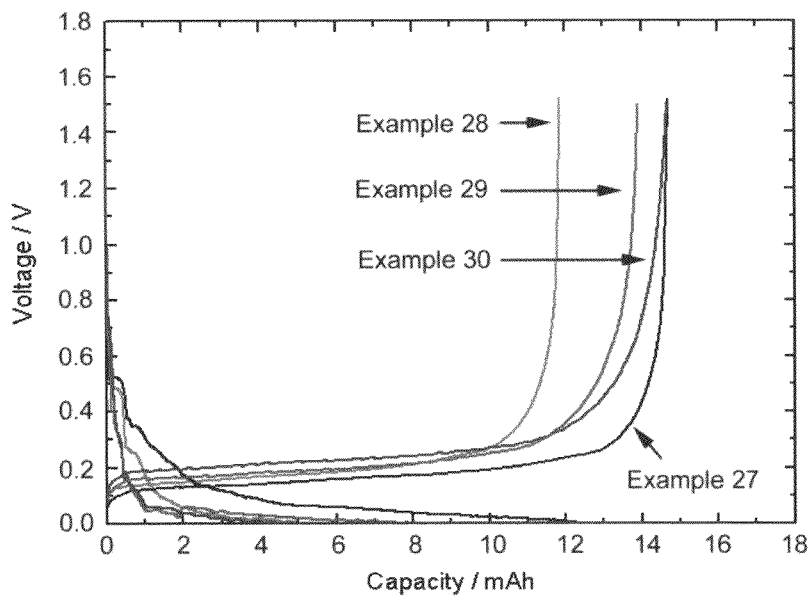
FIG. 4 is a graph illustrating charge and discharge characteristics of lithium batteries employing organic electrolytic solutions according to Examples 27 through 30.

Referring to FIG. 4, the half cells of Examples 27 through 30 (in which the aryl groups are substituted with halogen atoms) had high discharge efficiency of 70% or greater. Referring to Table 2, the discharge efficiency of the half cells of Examples 27 through 30 increased up to 90%. It is believed that the increase in discharge efficiency results from strong adsorption of the surfactant to the carbon-based electrode due to the halogen substitution, as described above.

The organic electrolytic solutions and lithium batteries of the present invention effectively prevent the electrolytic solution from contacting the anode, thereby suppressing side reactions on the anode surface. Thus, discharge capacity, charge/discharge efficiency, lifespan, and reliability of the battery are improved.

While the present invention has been described with reference to certain exemplary embodiments, it will be understood by those of ordinary skill in the art that various changes in form and details may be made to the described embodiments without departing from the spirit and scope of the present invention as defined by the following claims.

What is claimed is:

1. An organic electrolytic solution comprising:
    a lithium salt;
    an organic solvent comprising:
        a first solvent comprising at least one cyclic carbonate, and
        a second solvent comprising at least one aliphatic carbonate; and
    a surfactant selected from the group consisting of compounds represented by Formulae (4):

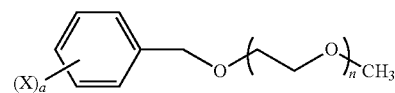

(4)

wherein X is a halogen atom;
a is 5; and
n is an integer of 1 to 100.

2. The organic electrolytic solution of claim 1, wherein the first solvent comprises a compound selected from the group consisting of ethylene carbonate, propylene carbonate, butylene carbonate, γ-butyrolactone and combinations thereof.

3. The organic electrolytic solution of claim 1, wherein the second solvent comprises a compound selected from the group consisting of dimethyl carbonate, ethylmethyl carbonate, diethyl carbonate, dipropyl carbonate, dimethoxyethane, diethoxyethane, fatty acid ester derivatives and combinations thereof.

4. A lithium battery comprising:
    a cathode;
    an anode; and
    the organic electrolytic solution of claim 1.

5. The organic electrolytic solution of claim 1, wherein the surfactant is present in an amount ranging from about 5 to about 10% by weight based on the total weight of the organic solvent.

6. The organic electrolytic solution of claim 1, wherein the surfactant is present in an amount ranging from about 0.5 to about 10% by weight based on the total weight of the organic solvent.

7. The organic electrolytic solution of claim 1, wherein the surfactant is present in an amount ranging from about 1 to about 10% by weight based on the total weight of the organic solvent.

\* \* \* \* \*